United States Patent [19]

Malchow

[11] 3,903,738
[45] Sept. 9, 1975

[54] ROTATING MACHINERY TORQUE SENSING ARRANGEMENT

[75] Inventor: Gregory L. Malchow, Savoy, Ill.

[73] Assignee: General Motors Corporation, Detroit, Mich.

[22] Filed: June 13, 1974

[21] Appl. No.: 478,842

[52] U.S. Cl............ 73/136 R; 73/117.3; 73/141 A
[51] Int. Cl.² ........................................ G01L 3/02
[58] Field of Search.... 73/136 R, 141 A, 116, 117.3

[56] References Cited
UNITED STATES PATENTS

| 2,135,394 | 11/1938 | Geissen | 73/136 R X |
| 3,173,292 | 3/1965 | Diehl et al. | 73/136 R |
| 3,201,982 | 8/1965 | Kennedy | 73/136 R |
| 3,686,941 | 8/1972 | Kramasz, Jr. et al. | 73/117.3 |

Primary Examiner—Charles A. Ruehl
Attorney, Agent, or Firm—Ronald L. Phillips

[57] ABSTRACT

A torque sensing device replaces one of the engine mounts in an engine and transmission installation and has a strain gauge arrangement that senses driveline torque with substantially linear force strain characteristics.

2 Claims, 12 Drawing Figures 3,903,738

ROTATING MACHINERY TORQUE SENSING ARRANGEMENT

This invention relates to a rotating machinery torque sensing arrangement and more particularly to a torque sensing arrangement that senses the torque reaction of an engine and transmission in an engine mount.

In rotating machinery, the measurement of torque is essential to determining the power being transmitted. Automotive engineers in their vehicle and power train development work have measured engine power with widely varied means. For example, it has been common practice to tow the vehicle and analyze the tension in the tow line to determine engine power. Another approach has been to use torque sensing transducers in conjunction with slip rings to determine the torque present in a vehicle driveline. Towing requires considerable amounts of equipment and manpower and the use of slip rings generally has inherent problems of accuracy, repeatability, durability and response. In an apparent effort to provide a simple method of measuring driveline torque, a sensing arrangement has been proposed that is mounted between the engine and the supporting vehicle frame and senses engine motion which is then correlated to torque. However, this is an indirect approach and because such an arrangement is an adjunct to the normal installation, it may not be readily installed in different vehicles for measuring purposes.

An object of the present invention is to provide a new and improved rotating machinery torque sensing arrangement that provides a more direct approach to sensing torque.

Another object is to provide in an engine and transmission installation a torque sensing arrangement that temporarily replaces one of the normal engine mounts and directly senses the torque reaction of the engine and transmission.

Another object is to provide an engine-transmission torque sensing arrangement that replaces one of the normal engine mounts in an engine and transmission installation and is subjected to either compressive forces or tensile forces but not bending forces in reaction to engine torque to provide substantially linear force strain characteristics in sensing the torque of the engine and transmission.

These and other objects of the present invention will be more apparent from the following description and drawing in which.

Figure 1:
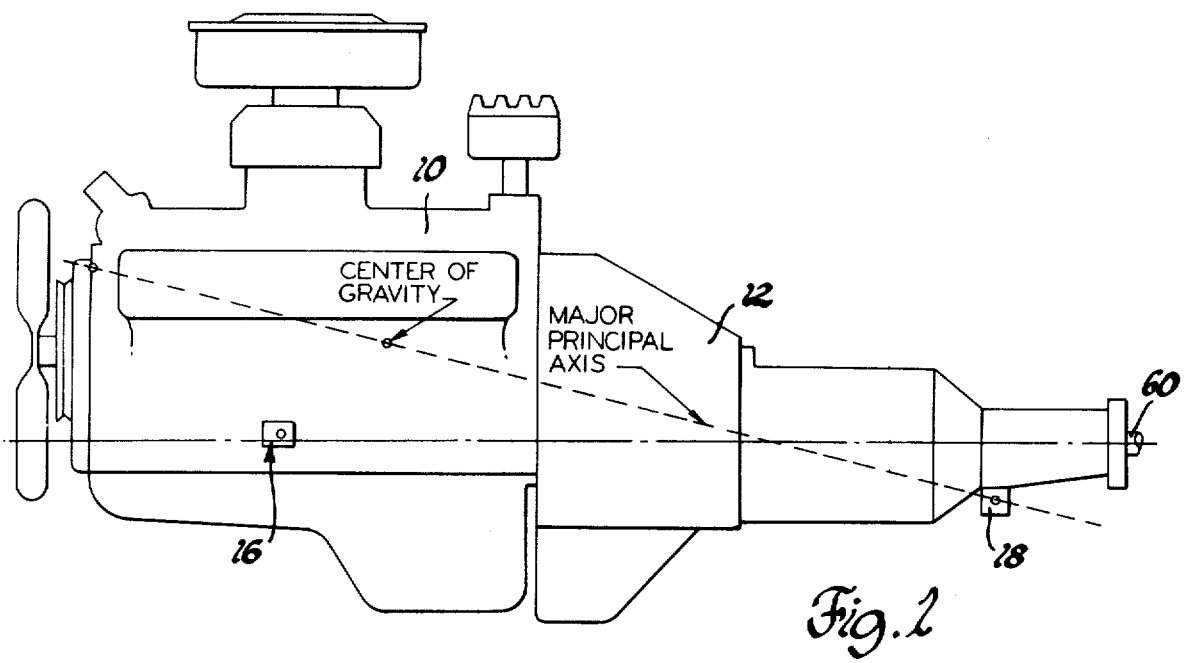
FIG. 1 is a side elevational view of an engine and transmission installation in a vehicle.
Figure 2:
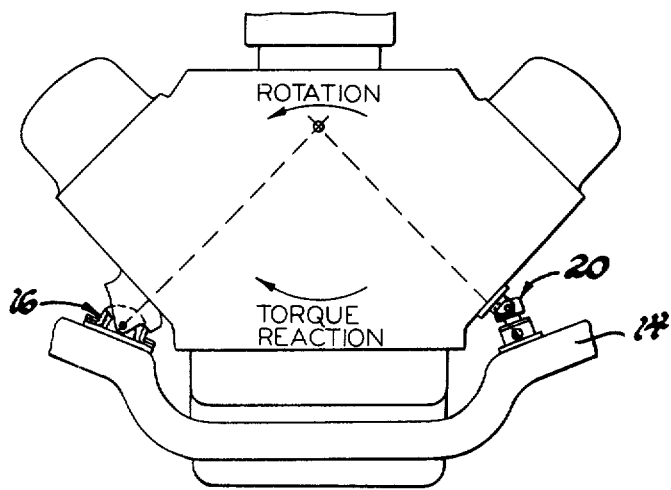
FIG. 2 is a rear elevational view of the installation in FIG. 1 showing one of the normal engine mounts and an engine-transmission torque sensing device according to the present invention temporarily replacing the other normal engine mount.
Figure 3:
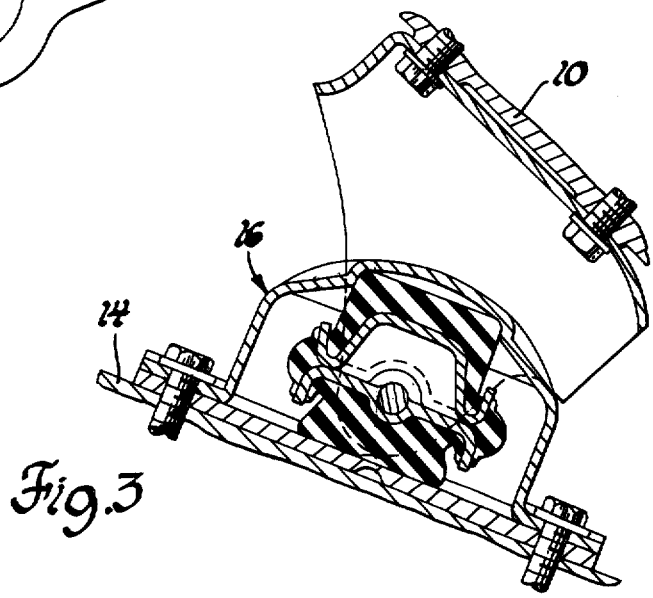
FIG. 3 is an enlarged sectional view from FIG. 2 showing the normal engine mount.
Figure 4:
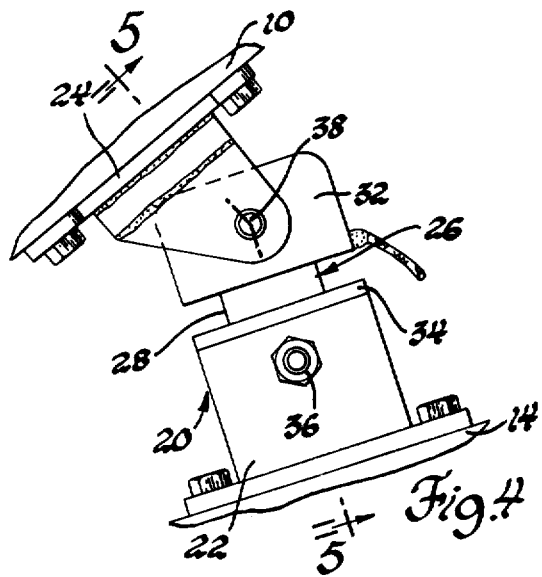
FIG. 4 is an enlarged view from FIG. 2 showing the engine-transmission torque sensing device according to the present invention.
Figure 5:
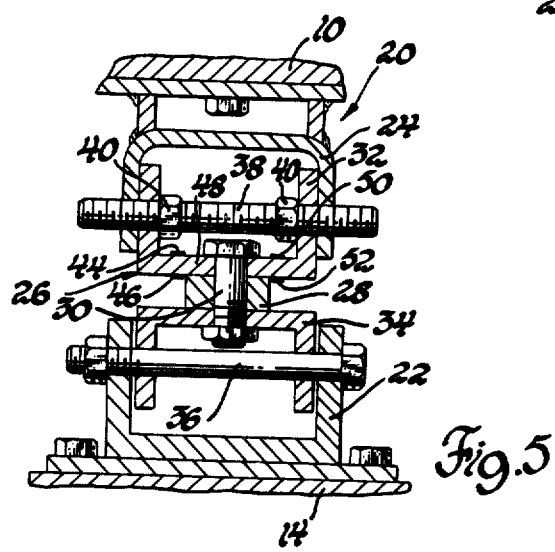
FIG. 5 is a view taken along the line 5—5 in FIG. 4.
Figure 6:
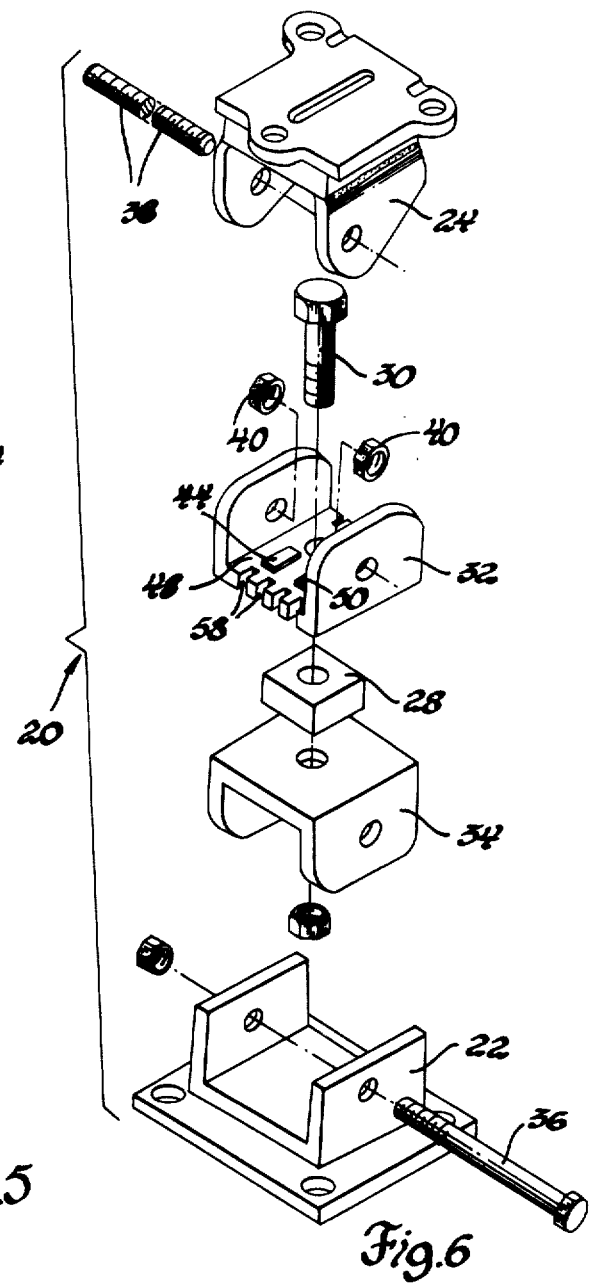
FIG. 6 is an exploded view of the engine-transmission torque sensing device in FIGS. 4 and 5.

Referring to FIGS. 1 and 2, there is shown an internal combustion engine 10 and a transmission 12 rigidly secured thereto which are supported on a vehicle frame or chassis 14 by a three-point engine mounting arrangement like that disclosed in detail in U.S. Pat. No. 2,953,336 assigned to the assignee of this invention. Typically, this mounting system comprises a pair of identical elastomeric front mounts 16 and an elastomeric rear mount 18, one of the normal front mounts 16 being shown in FIG. 2 as temporarily replaced by a torque sensing mount 20 according to the present invention whose details will be described in more detail later. The normal front engine mounts 16 which are of the bushing type as best shown in FIG. 3 are like that disclosed in detail in U.S. Pat. No. 3,731,896 assigned to the assignee of this invention and the rear mount 18 is like that disclosed in the aforementioned U.S. Pat. No. 2,953,336. In the normal engine-transmission mounting arrangement, the rear mount 18 is secured between the bottom of the transmission 12 and a frame cross member, not shown, rearward of the center of gravity of the engine and transmission. The two front mounts 16 are located forward of the center of gravity and are secured between opposite sides of the engine 10 and the frame 14 and are inclined so that their elastomeric material resists engine roll in shear to provide a soft roll rate. As shown in FIG. 2 by the arrows, the torque reaction of the engine and transmission combination is the tendency for the engine to rotate clockwise which is counter to the direction of engine rotation and this produces compressive forces in the right engine mount and tensile forces in the left engine mount. In arriving at the present invention it was found that very little reaction torque is taken by the rear mount 18 and that a very direct approach to measuring the torque of the engine and transmission in the vehicle could be obtained in a relatively easy manner by the temporary installation of a force transducer in lieu of one of the normal front engine mounts 16. It was found that this could best be accomplished by sensing the compressive forces in the right engine mount installation with the use of the torque sensing mount 20 which has a rigid structure whose details are best shown in FIGS. 4, 5 and 6.

In the torque sensing engine mount 20, there is provided a frame mounting bracket 22 and an engine mounting bracket 24 whose bolt patterns are the same as those of the normal front engine mount 16 so that they can be readily bolted in place where the normal engine mounting brackets are located. But in lieu of the normal elastomeric vibration isolation system between the mounting brackets 22 and 24, there is provided a rigid link generally designated as 26 that is pivotably connected at its opposite ends to these brackets. The link 26 comprises a block 38 which is secured by a nut and bolt assembly 30 at its opposite ends to an upper yoke 32 and a lower yoke 34. The lower yoke 34 is pivotably connected by a pivot pin assembly 36 to the frame mounting bracket 22 and the upper yoke 32 is pivotably connected to the engine mounting bracket 24 by a threaded rod 38 on which jam nuts 40 are threaded inside the arms of the yoke to prevent their spreading under compressive loading. Furthermore, in the installation the axes of the pivot connections of the link 26 are arranged parallel to the major principal axis or roll axis of the engine and transmission and thus the rigid link 26 is subjected to compressive forces in reaction to engine torque but is not subject to any shearing forces from bending which could produce measurement error for the measurement devices that are mounted on the link as will now be described.

Figure 7:
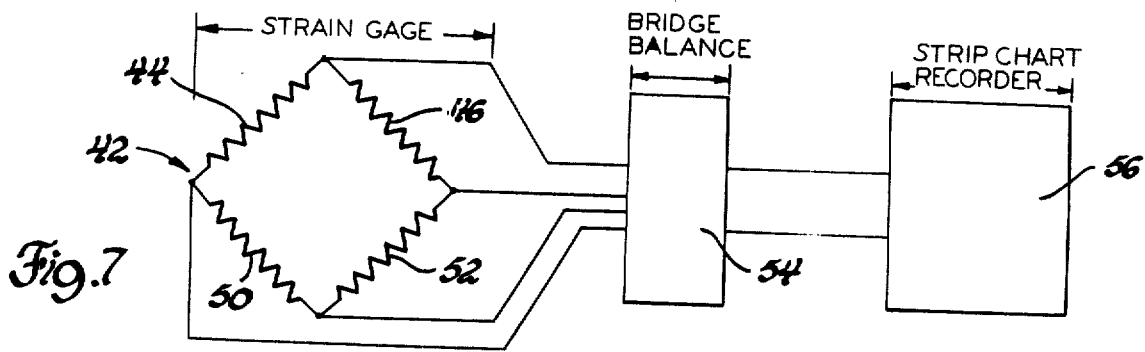
FIG. 7 is a schematic of the electrical circuit for the engine-transmission torque sensing device.

Measurement of the compressive forces as a result of torque reaction in the torque sensing engine mount 20 is provided by a four-active arm strain gauge arrangement 42 which is wired as shown in FIG. 7. The two strain gauges 44 and 46 in half of the bridge are mounted on opposite sides of the base 48 of the upper yoke 32 at one side of the block 28 that is at right angles to the yoke pivot axis and the other two strain gauges 50 and 52 in the other half of the bridge are also located on opposite sides of the base 48 but on the opposite side of the block 28. The strain gauge bridge 42 is connected to a bridge balance 54 and the output of this bridge balance which indicates deflection in the yoke base 48 as a result of compressive forces is inputed to a strip chart recorder 56 from which the strain in the gauges and thus an indication of the compressive torque reaction forces thereon in the mount can be visually read.

The strain gauges 44, 46, 50 and 52 are located near the edge of the block 28 so that the strain measured is maximized. Furthermore, several saw cuts 58 made in the yoke base section 48 further increase and control the strain characteristics while the threaded rod 38 with the jam nuts 40 in cooperation with the lateral restraint of the yoke 32 between the arms of the engine mounting bracket 24 makes the yoke base 48 where the strain gauges are attached behave as cantilever beams underneath the loads taken at the two in-line pivots of this yoke so that substantially linear force strain characteristics of substantial magnitude are obtained in response to the torque reaction at this mount.

Figure 8:
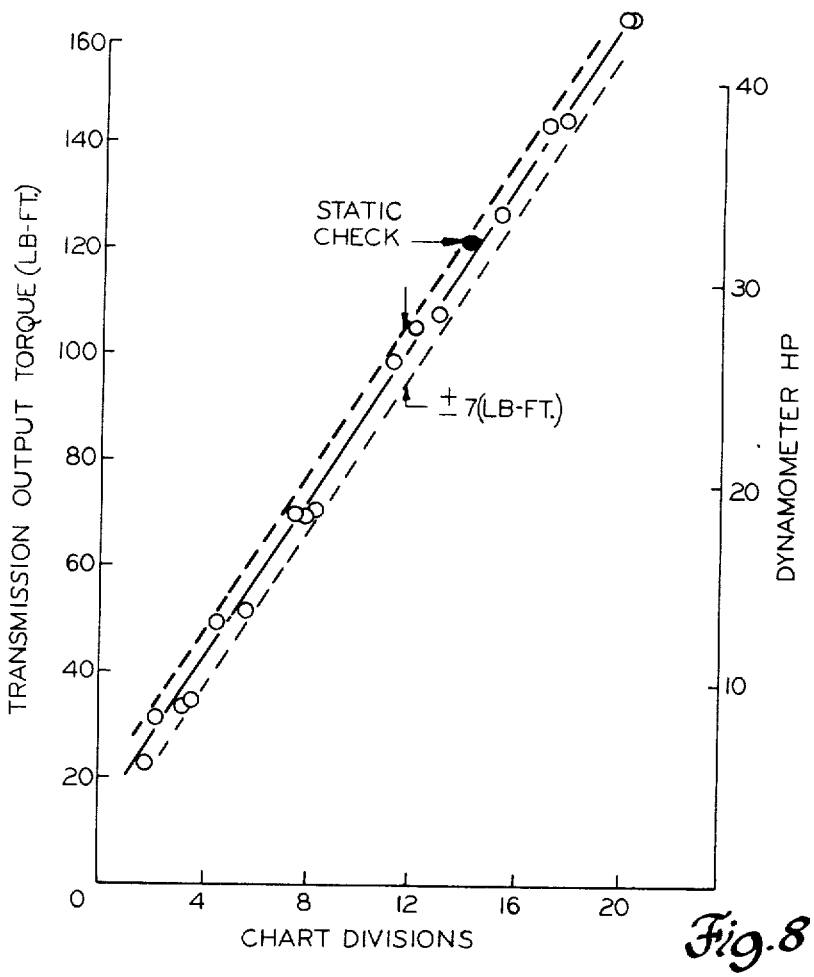
FIG. 8 is a graph showing a chassis dynamometer calibration of the electrical circuit in FIG. 7.

A typical calibration of the strain gauge arrangement using a chassis dynamometer is shown in FIG. 8 wherein transmission output or driveline torque and dynamometer horsepower are equated to the strain gauge readings on the chart divisions of the strip recorder 56. The spread of this data indicates the particular system was accurate to ± 7 LB-FT. A cross check of the dynamometer results was made with a static calibration where weights were suspended from a torque arm which was connected to the transmission output shaft 60, the attachments to the engine and transmission such as exhaust pipes, throttle linkages, and electrical wires being either very flexible themselves or mounted in a flexible manner so that their effect was believed to be negligible. In the static calibration, the movement of the engine and transmission under changing load was observed to be very small and therefore it can be concluded that these attachments were not actually capable of absorbing a significant amount of torque and therefore the calibration performed was valid.

Figure 9:
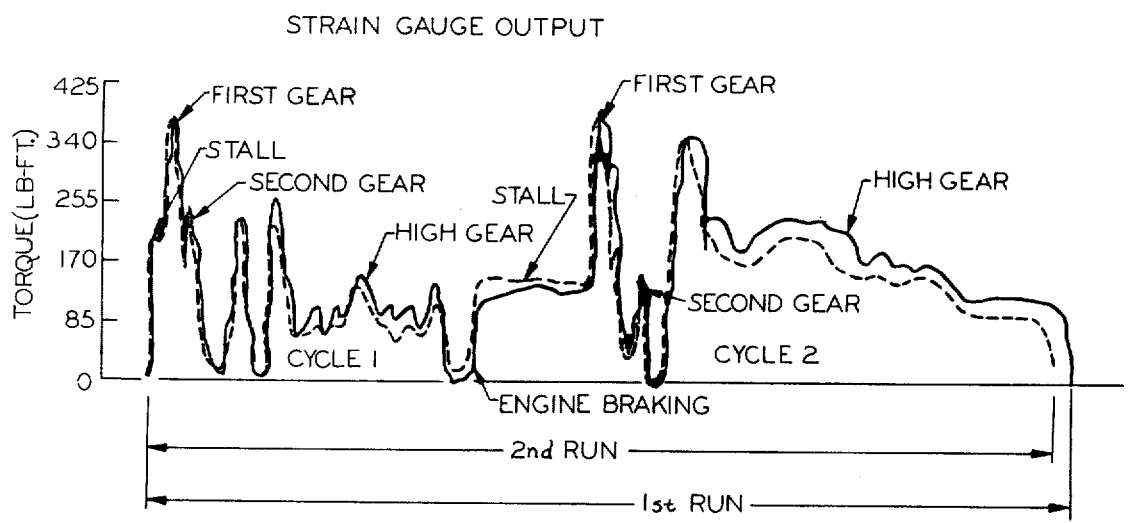
FIGS. 9 through 12 are graphs showing measurements obtained by the present invention during certain vehicle driving cycles.
Figure 10:
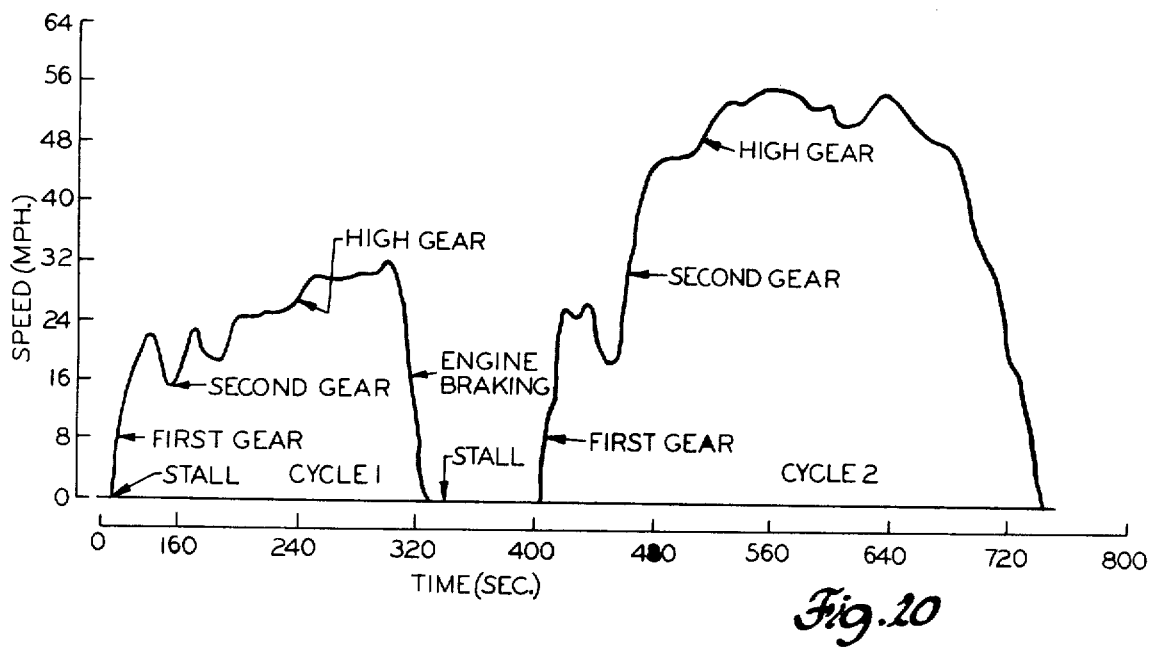
Figure 11:
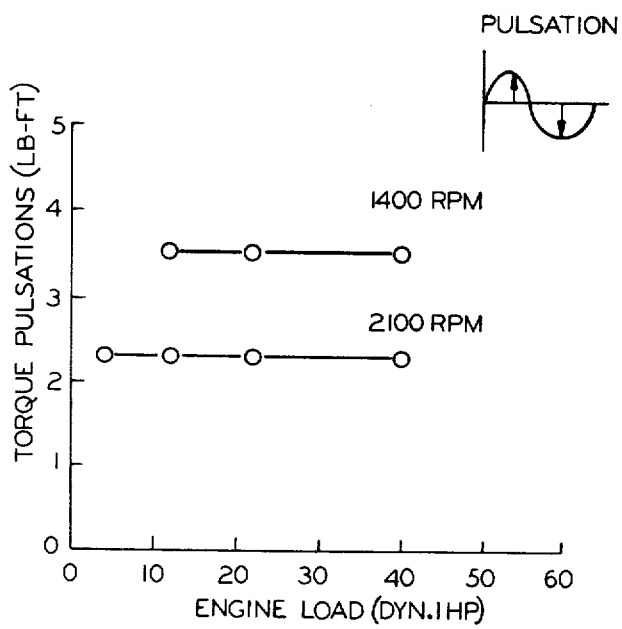
Figure 12:
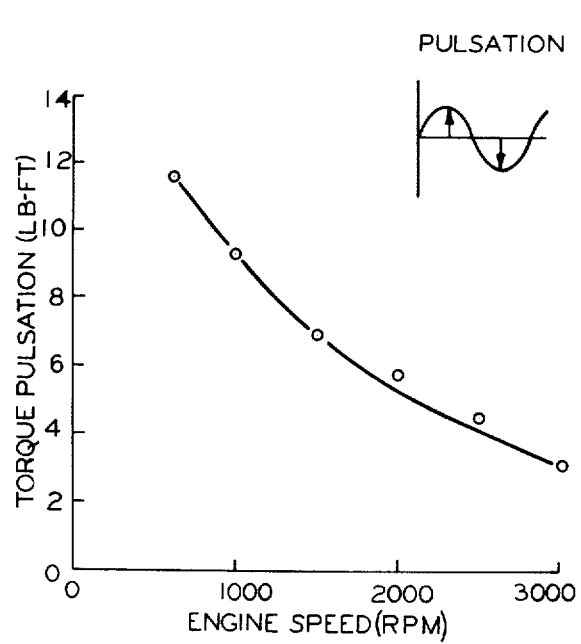

To illustrate the detailed results that can be obtained from the use of the torque sensing arrangement according to the present invention, reference is made to FIGS. 9 through 12. Referring first to FIGS. 9 and 10, the vehicle with the torque sensing device 20 installed was operated through two cycles of a certain driving cycle that was repeated twice, the transmission in this case having three different gears or speed ratios. As shown in these Figures, each cycle has five important characteristics. The first characteristic is at the beginning of the cycle when the vehicle was held stationary with the transmission in gear. Here the torque sensing device clearly measures the output stall torque of the transmission. The second, third and fourth points pertain to first, second and high gear operation, respectively, of the transmission. Each cycle began with an acceleration in first gear and as the cycle proceeded upshifts into second and high gear took place. As these events occurred, the torque as measured by the torque sensing device rose to a maximum during first gear operation and decreased in the second and high gear modes. The cycles concluded with a decrease in torque and the occurrence of a negative torque which is the fifth significant characteristic and is due to engine breaking. From the similarity of the corresponding cycles, it is seen that there was obtained excellent repeatability. To illustrate what can be further obtained from such a sensitive torque sensing device, reference is made to FIG. 11 where with the use of the subject invention it is clearly shown that engine speed has a strong effect on the torque pulsations on the transmission output shaft while in FIG. 12 there is depicted in contrast a clear showing that engine load has a negligible effect on the torque pulsations. These clear showings result from the direct approach to measurement of engine torque sensing provided by the present invention.

It will also be appreciated that the output of the strain gauges as recorded by the strip chart recorder 56 may be used with the corresponding vehicle or engine speed as obtainable from any suitable speed indicator to calculate driveline power and also provide a close indication of engine power neglecting power loss in the transmission. With this capability the power requirements of the various inertia weights, axial ratio, tires and transmission may be compared. Furthermore, the strain gauge signal may be used in place of intake manifold vacuum to control such engine parameters as air-fuel ratio, spark advance and exhaust gas recirculation rate.

The above described embodiment is illustrative of the invention which may be modified within the scope of the appended claims.

I claim:

1. In a vehicle, a frame, an engine, a transmission rigidly secured to said engine, an engine-transmission mounting arrangement supporting said engine and transmission on said frame including one engine mount that resists engine torque in tension and another engine mount that resists engine torque in compression, and engine-transmission torque sensing means for replacing one of said engine mounts to provide engine-transmission torque measurements, said engine-transmission torque sensing means including a rigid link having a yoke at one end pivotably connected to said engine and a yoke at the other end pivotably connected to said frame whereby either compressive forces or tensile forces but not bending forces are produced in said link in reaction to engine torque, strain gauge means mounted on one of said yokes for sensing the torque reaction forces in said link, said one yoke having deflection characteristics to insure substantially linear force strain characteristics of substantial magnitude for the torque sensing obtained from said strain gauge means.

2. In a vehicle, a frame, an engine, a transmission rigidly secured to said engine, an engine-transmission mounting arrangement supporting said engine and transmission on said frame including one engine mount that resists engine torque in tension and another engine mount that resists engine torque in compression, and engine-transmission torque sensing means for replacing one of said engine mounts to provide engine-transmission torque measurements, said engine-transmission torque sensing means including a rigid link having a yoke at one end pivotably connected to said engine and a yoke at the other end pivotably connected to said frame whereby either compressive forces or tensile forces but not bending forces are produced in said link in reaction to engine torque, a four-active arm strain gauge bridge arrangement mounted on one of said yokes for sensing the torque reaction forces in said link, said one yoke having deflection characteristics so that it acts as cantilever beams on opposite sides of said rigid link for halves of said strain gauge bridge to insure substantially linear force strain characteristics of substantial magnitude for the torque sensing obtained from said strain gauges.

* * * * *